(12) United States Patent
Otani et al.

(10) Patent No.: US 8,804,154 B2
(45) Date of Patent: Aug. 12, 2014

(54) IMAGE FORMING APPARATUS

(75) Inventors: Atsushi Otani, Moriya (JP); Akihiko Sakai, Abiko (JP); Keita Takahashi, Abiko (JP); Hirotaka Seki, Tokyo (JP); Shoji Takeda, Tokyo (JP); Satoru Yamamoto, Abiko (JP); Shigeo Hata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 12/711,314

(22) Filed: Feb. 24, 2010

(65) Prior Publication Data

US 2010/0231948 A1 Sep. 16, 2010

(30) Foreign Application Priority Data

Mar. 16, 2009 (JP) ................................ 2009-063234

(51) Int. Cl.
*G06K 15/00* (2006.01)
*G06F 3/12* (2006.01)
*H04N 15/00* (2006.01)
*B41J 29/393* (2006.01)
*B41J 2/205* (2006.01)
*B41J 2/17* (2006.01)

(52) U.S. Cl.
USPC ......... 358/1.14; 358/1.15; 358/1.9; 358/1.16; 358/400; 347/19; 347/15; 347/98; 709/201; 709/203; 710/110; 710/48; 710/8

(58) Field of Classification Search
USPC ................ 358/400, 434, 443, 1.15, 1.9, 1.16, 358/1.14; 347/19
See application file for complete search history.

(56) References Cited

U.S. PATENT DOCUMENTS

| 4,860,111 | A | * | 8/1989 | Shimizu et al. | 358/400 |
| 5,530,946 | A | * | 6/1996 | Bouvier et al. | 714/23 |
| 5,721,621 | A | * | 2/1998 | Komaki et al. | 358/296 |
| 6,196,670 | B1 | * | 3/2001 | Saruta | 347/86 |
| 6,198,981 | B1 | * | 3/2001 | Nakamura et al. | 700/121 |
| 6,199,169 | B1 | * | 3/2001 | Voth | 713/400 |
| 6,347,202 | B1 | * | 2/2002 | Shishizuka et al. | 399/75 |

(Continued)

FOREIGN PATENT DOCUMENTS

JP 2-129656 A 5/1990
JP 5-181760 A 7/1993

(Continued)

OTHER PUBLICATIONS

Office Action dated Apr. 30, 2013, in Japanese Application No. 2009-100371.

(Continued)

*Primary Examiner* — Akwasi M Sarpong
(74) *Attorney, Agent, or Firm* — Fitzpatrick, Cella, Harper & Scinto

(57) ABSTRACT

This invention provides an image forming apparatus to which a distributed control system is applied and which improves error detection accuracy in each control unit. To accomplish this, the image forming apparatus includes a master control unit which controls the overall image forming apparatus, a plurality of sub-master control units which control a plurality of functions required to implement image formation, and a plurality of slave control units which control loads required to implement the plurality of functions. Each slave control unit includes a monitoring unit which monitors the operation of the other active slave control unit and performs an error diagnosis when the slave control unit is inactive.

5 Claims, 12 Drawing Sheets

(56) References Cited

U.S. PATENT DOCUMENTS

| | | | |
|---|---|---|---|
| 6,625,498 B1* | 9/2003 | Kurakake et al. | 700/3 |
| 6,801,329 B1 | 10/2004 | Urabe et al. | |
| 6,947,164 B2* | 9/2005 | Kato | 358/1.15 |
| 6,950,956 B2* | 9/2005 | Zerbe et al. | 713/400 |
| 7,006,249 B2* | 2/2006 | Matsuda | 358/1.9 |
| 7,027,169 B1 | 4/2006 | Morikawa et al. | 358/1.14 |
| 7,046,938 B2 | 5/2006 | Yamamoto et al. | |
| 7,089,338 B1* | 8/2006 | Wooten et al. | 710/110 |
| 7,152,942 B2* | 12/2006 | Walmsley et al. | 347/19 |
| 7,164,873 B2 | 1/2007 | Yamamoto et al. | |
| 7,167,256 B1* | 1/2007 | Koike et al. | 358/1.15 |
| 7,171,573 B2 | 1/2007 | Scheele | |
| 7,609,404 B2* | 10/2009 | Nakahashi | 358/1.15 |
| 7,791,777 B2* | 9/2010 | Barry et al. | 358/518 |
| 8,164,785 B2* | 4/2012 | Ferlitsch | 358/1.6 |
| 8,180,924 B2* | 5/2012 | Shiraishi | 709/250 |
| 8,199,144 B2* | 6/2012 | Sakura et al. | 345/418 |
| 2002/0101604 A1* | 8/2002 | Mima et al. | 358/1.15 |
| 2004/0145775 A1* | 7/2004 | Kubler et al. | 358/1.15 |
| 2005/0055469 A1 | 3/2005 | Scheele | |
| 2005/0254090 A1* | 11/2005 | Kammerlocher et al. | 358/1.18 |
| 2006/0066901 A1 | 3/2006 | Sugita | |
| 2007/0086037 A1 | 4/2007 | Kitahara et al. | |
| 2007/0103702 A1 | 5/2007 | Yamamoto et al. | |
| 2007/0139702 A1* | 6/2007 | Sato et al. | 358/1.15 |
| 2007/0182991 A1* | 8/2007 | Matsuda | 358/1.15 |
| 2007/0260753 A1 | 11/2007 | Komatsu et al. | |
| 2007/0294563 A1* | 12/2007 | Bose | 714/5 |
| 2010/0231948 A1* | 9/2010 | Otani et al. | 358/1.14 |
| 2012/0050812 A1* | 3/2012 | Takahashi | 358/1.16 |

FOREIGN PATENT DOCUMENTS

| | | |
|---|---|---|
| JP | 5-183673 A | 7/1993 |
| JP | 11-146116 A | 5/1999 |
| JP | 2001-16382 A | 1/2001 |
| JP | 2002-301997 | 10/2002 |
| JP | 2004-158000 A | 6/2004 |
| JP | 2004-287673 A | 10/2004 |
| JP | 2006-191338 | 7/2006 |
| JP | 2006-256275 | 9/2006 |
| JP | 2006-293138 A | 10/2006 |

OTHER PUBLICATIONS

U.S. Appl. No. 12/731,218, filed Mar. 25, 2010, Atsushi Otani, Shigeo Hata, Akihiko Sakai, Shoji Takeda, Satoru Yamamoto, Keita Takahashi, Hirotaka Seki.

* cited by examiner

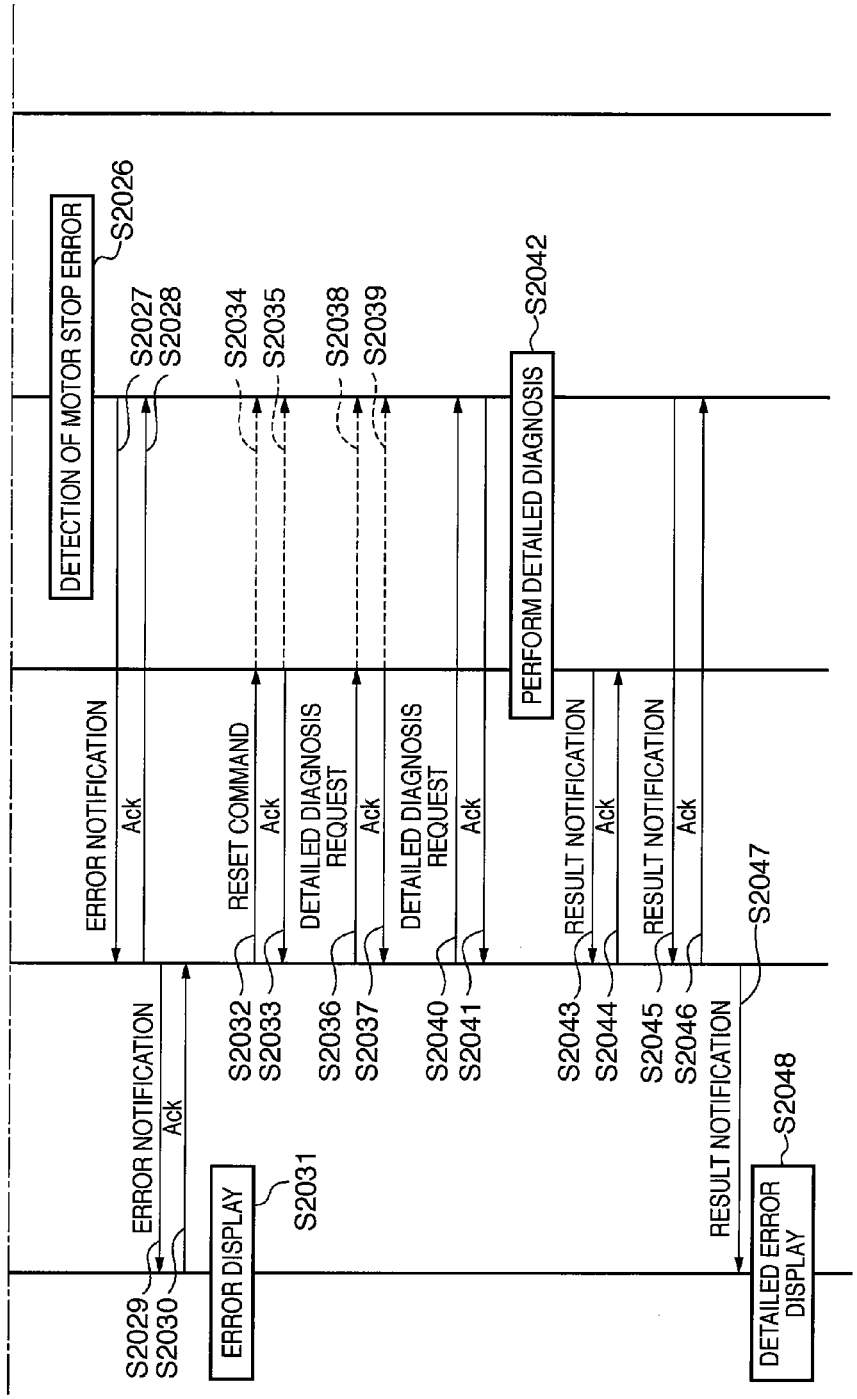

IMAGE FORMING APPARATUS

BACKGROUND OF THE INVENTION

1. Field of the Invention

The present invention relates to an image forming apparatus which is implemented by a distributed control system including a plurality of CPUs having a hierarchical structure.

2. Description of the Related Art

In printer device control of an image forming apparatus which adopts an electrophotography system, concentrated control using one CPU is performed. However, a CPU having higher performances is required due to an increase in CPU load owing to the control concentrated on one CPU. Furthermore, along with an increase in load on a printer device, communication cables (communication wiring harnesses) have to run from a control CPU board to distant load driver units, thus requiring a large number of heavyweight control communication wiring harnesses. To solve this problem, a control mode that divides respective control modules, which configure an electrophotography system, into individual sub CPUs has received a lot of attention.

Examples of building control systems by dividing individual partial module control functions using a plurality of CPUs have been proposed in some controlled device product fields other than copying machines. For example, a vehicle system adopts a distributed control system. However, unlike a central administration system based on the concentrated control, the distributed control system requires strict error detection so as to allow a plurality of boards (CPUs), which operate in cooperation with each other, to operate normally.

For example, Japanese Patent Laid-Open No. 2006-191338 has proposed a gateway apparatus, which monitors periodic messages, which are periodically transmitted in a plurality of buses, and detects a faulty device based on communication statuses of the periodic messages. Also, Japanese Patent Laid-Open No. 2002-301997 has proposed a technique for easily specifying failure factors of a vehicle by outputting pseudo-control information from a failure diagnosis apparatus.

However, the aforementioned related arts suffer the following problems. In the distributed control system in which a plurality of CPUs perform cooperative control, it is important to individually make operation confirmations of the CPUs which perform the cooperative control, and to specify a faulty portion when an error has occurred. By providing a device which concentratedly monitors failures, a faulty node can be confirmed. However, a dedicated monitoring node is required, thus causing an increase in cost. When a system is configured to have a hierarchical structure, it becomes difficult to specify detailed faulty portions if failure determination is performed based only on the traffics of upper layers.

It is effective to detect a faulty portion in a test mode. However, when such test mode is applied to an image forming apparatus, the contents to be tested are limited in a state in which a paper jam has occurred due to a failure during operation.

Furthermore, when a dynamic timing error has occurred, or in case of emergency shutdown processing during operation, it is difficult to detect a faulty portion in the test mode.

SUMMARY OF THE INVENTION

The present invention enables realization of an image forming system to which a distributed control system is applied, and which can improve the error detection accuracy in respective control units.

One aspect of the present invention provides an image forming apparatus comprising: a master control unit that controls the image forming apparatus which forms an image on a printing material; a sub-master control unit that is controlled by the master control unit and controls a function required to perform image formation; and a first and second slave control units that are controlled by the sub-master control unit and respectively control a first and second loads required to implement the functions, wherein the first slave control unit comprises: a monitoring unit that monitors an operation of the second slave control unit in an active state.

Another aspect of the present invention provides an image forming apparatus comprising: a master control unit that controls the image forming apparatus which forms an image on a printing material; a sub-master control unit that is controlled by the master control unit and controls a function required to implement image formation; and a slave control unit that is controlled by the sub-master control unit and controls a load required to implement the function, wherein the slave control unit comprises a monitoring unit that monitors an operation of the sub-master control unit.

Still another aspect of the present invention provides an image forming apparatus comprising: a upper layer control unit that controls functions required to form an image on a printing material; and a first and second lower layer control units that are controlled by the upper layer control unit and control loads required to implement the functions, wherein the first lower layer control unit monitors an operation of the second lower layer control unit in an active state.

Yet still another aspect of the present invention provides an image forming apparatus comprising: a upper layer control unit that controls functions required to form an image on a printing material; and a first-lower layer control unit and a second-lower layer control unit that are controlled by the upper layer control unit and control loads required to implement the functions, wherein the first-lower layer control unit comprises a monitoring unit that monitors an operation of the second-lower layer control unit which is active.

Further features of the present invention will be apparent from the following description of exemplary embodiments with reference to the attached drawings.

BRIEF DESCRIPTION OF THE DRAWINGS

FIGS. 11A and 11B are sequence charts in respective control units in an operation confirmation mode according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Arrangement of Image Forming Apparatus

Figure 1:
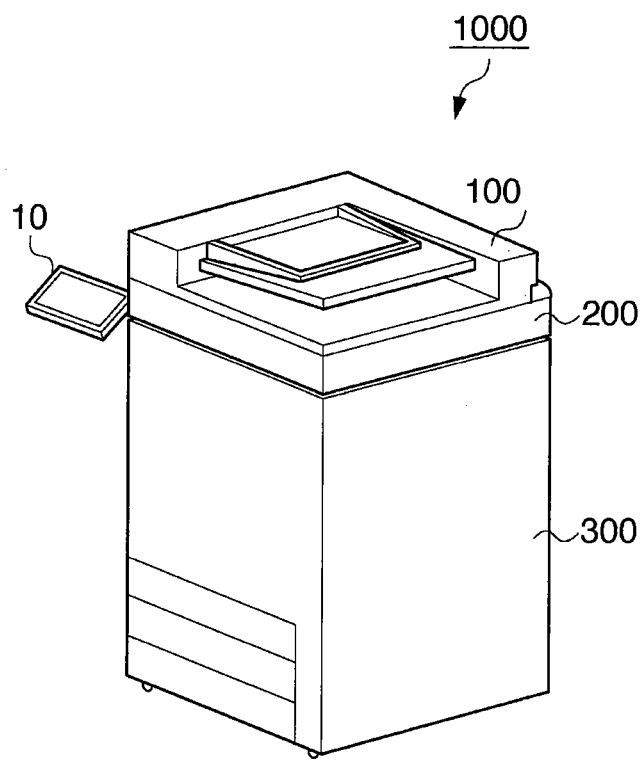
FIG. 1 is a perspective view showing an overview of an image forming apparatus 1000 according to an embodiment of the present invention.

An embodiment of the present invention will be described hereinafter with reference to FIGS. 1 to 11B. As shown in FIG. 1, an image forming apparatus 1000 includes an automatic document feeder 100, image reading unit 200, image forming unit 300, and console 10. The image reading unit 200 is placed on the image forming unit 300. Furthermore, the automatic document feeder (DF) 100 is placed on the image reading unit 200. This image forming apparatus 1000 implements distributed control using a plurality of control units (CPUs).

The automatic document feeder 100 automatically conveys a document onto a platen glass. The image reading unit 200 reads the document conveyed by the automatic document feeder 100 and outputs image data. The image forming unit 300 forms an image on a printing material according to the image data output from the automatic document feeder 100 or image data input from an external device connected via a network. The console 10 has a GUI (Graphical User Interface) that allows the user to perform various operations. Furthermore, the console 10 has a display unit such as a touch panel, and can present information to the user.

Image Forming Unit

The image forming unit 300 will be described in detail below with reference to FIG. 2. Note that the image forming unit 300 of this embodiment adopts an electrophotography system. Also, note that alphabets Y, M, C, and K suffixed to reference numerals in FIG. 2 respectively indicate engines corresponding to yellow, magenta, cyan, and black toners. In the following description, reference numerals will be described by omitting suffixed alphabets Y, M, C, and K to indicate engines corresponding to all the toners, and alphabets Y, M, C, and K will be suffixed to reference numerals to indicate individual engines.

Each photosensitive drum (to be simply referred to as a "photosensitive member" hereinafter) 225 used to form a full-color electrostatic image as an image carrier is rotatable by a motor in a direction of an arrow A. Around the photosensitive member 225, a primary charging device 221, exposure device 218, developing device 223, transfer device 220, cleaner device 222, and charge removing device 271 are arranged.

A developing device 223K is that used for monochrome development, and develops a latent image on a photosensitive member 225K by K toner. Developing devices 223Y, 223M, and 223C are those used for full-color development, and respectively develop latent images on photosensitive members 225Y, 225M, and 225C by Y, M, and C toners. Toner images of the respective colors developed on the photosensitive members 225 are simultaneously multiple-transferred onto a transfer belt 226 as an intermediate transfer member by the transfer devices 220, thus superimposing the toner images of the four colors.

The transfer belt 226 is looped around rollers 227, 228, and 229. The roller 227 is coupled to a driving source to serve as a driving roller which drives the transfer belt 226, and the roller 228 serves as a tension roller which adjusts the tension of the transfer belt 226. The roller 229 serves as a backup roller of a transfer roller as a secondary transfer device 231. A transfer roller attachment/detachment unit 250 is a driving unit used to attach or detach the secondary transfer device 231 to or from the transfer belt 226. A cleaner blade 232 is arranged below the transfer belt 226 at a position after the secondary transfer device 231 is passed, and scrapes off residual toner on the transfer belt 226.

Each of printing materials (printing sheets) stored in trays 240 and 241 and a manual feed tray 253 is fed to a nip portion, i.e., a contact portion between the secondary transfer device 231 and transfer belt 226 by a registration roller pair 255, a paper feed roller pair 235, and vertical path roller pairs 236 and 237. Note that the secondary transfer device 231 is brought in contact with the transfer belt 226 by the transfer roller attachment/detachment unit 250 in this case. A toner image formed on the transfer belt 226 is transferred onto the printing material at this nip portion. After that, the printing material on which the toner image is transferred is fed into a fixing device 234 to thermally fix the toner image, and is then discharged outside the apparatus.

The trays 240 and 241 and the manual feed tray 253 respectively have sheet absence sensors 243, 244, 245 used to detect the presence/absence of printing materials. Also, the trays 240 and 241 and the manual feed tray 253 respectively have paper feed sensors 247, 248, and 249 used to detect pickup errors of printing materials.

The image forming operation by the image forming unit 300 will be described below. When image formation starts, one of printing materials stored in the trays 240 and 241 and the manual insert tray 253 is conveyed to the paper feed roller pair 235 by pickup rollers 238, 239, and 254. When the printing material is conveyed to the registration roller pair 255 by the paper feed roller pair 235, a registration sensor 256 located at a position immediately before the registration roller pair 255 detects the passage of the printing material.

At the time of detection of the passage of the printing material by the registration sensor 256, the convey operation is temporarily interrupted after an elapse of a predetermined period of time in this embodiment. As a result, the printing material abuts against the still registration roller pair 255 to stop its convey operation. In this case, the convey position of the printing material is fixed so that the edge portion of the printing material in the traveling direction is perpendicular to a convey path, thus correcting any skew of the printing material whose convey direction deviates from the convey path. This process will be referred to as position correction hereinafter. The position correction is required to minimize a subsequent tilt of the image forming direction with respect to the printing material. By activating the registration roller pair 255 after the position correction, the printing material is fed to the secondary transfer device 231. Note that the registration roller pair 255 is coupled to the driving source, and is rotated by receiving a driving force via a clutch.

Next, a voltage is applied to the primary charging devices 221 to uniformly minus-charge the surfaces of the photosensitive members 225 to have a scheduled charged portion potential. Then, each exposure device 218 including a laser scanner performs exposure so that an image portion on the corresponding charged photosensitive member 225 has a predetermined exposed portion potential, thus forming a latent image.

The exposure device 218 forms a latent image corresponding to an image by turning on and off a laser beam based on image data sent from a controller 460 via a printer control I/F 215.

A developing bias, which is set in advance for each color, is applied to a developing roller of each developing device 223, and the latent image is developed with toner to be visualized as a toner image when it passes the position of the developing roller. The toner image is transferred onto the transfer belt 226 by the transfer device 220, and is also transferred onto the printing material conveyed by a paper feed unit by the secondary transfer device 231. After that, the printing sheet passes through a post-registration convey path 268, and is conveyed to the fixing device 234 via a fixing conveyor belt 230.

In the fixing device 234, the printing material is charged by pre-fixing chargers 251 and 252 so as to make up for a toner attraction force and to prevent any image disturbance, and the toner image is thermally fixed by fixing rollers 233. After that, the printing material is discharged onto a discharge tray 242 by discharge rollers 270 when the convey path is switched to a discharge path 258 side by a discharge flapper 257.

Residual toner on each photosensitive member 225 is removed and recovered by the cleaner device 222. Finally, each photosensitive member 225 is uniformly discharged to a potential around 0 V by the charge removing device 271, thus preparing for the next image forming cycle.

The color image formation start timing by the image forming apparatus 1000 allows to form an image at an arbitrary position on the transfer belt 226 since Y, M, C, and K images are simultaneously transferred. However, the image formation start timing has to be decided while shifting transfer position differences of toner images on the photosensitive members 225Y, 225M, and 225C as timings.

Note that in the image forming unit 300, printing materials can be continuously fed from the trays 240 and 241 and the manual insert tray 253. In this case, printing materials are fed from the trays 240 and 241 and the manual insert tray 253 at shortest intervals that can prevent printing materials from overlapping in consideration of the sheet length of a preceding printing material. As described above, when the registration roller pair 255 is activated after the position correction, the printing material is fed to the secondary transfer device 231. When the printing material reaches the secondary transfer device 231, the registration roller pair 255 is temporarily stopped again. This is to apply the position correction to the trailing printing material in the same manner as the preceding printing material.

Operations performed when an image is formed on the reverse face of a printing material will be described in detail below. Upon forming an image on the reverse face of a printing material, image formation on the obverse face of the printing material is performed ahead. When an image is formed only on the obverse face, the printing material is directly discharged onto the discharge tray 242 after the toner image is thermally fixed by the fixing device 234. On the other hand, when image formation on the reverse face is to be continuously performed, the convey path is switched to a reverse face path 259 side by the discharge flapper 257 when the printing material is detected by a sensor 269, and the printing material is conveyed onto a two-sided reversal path 261 by rotation of reversal rollers 260 in synchronism with that detection. After that, the printing material is conveyed onto the two-sided reversal path 261 by only a width in the convey direction. Then, the traveling direction of the printing material is switched by reverse rotation of the reversal rollers 260, and the printing material is conveyed onto a two-sided path 263 by driving two-sided path convey rollers 262 with an image surface, i.e., the obverse face on which an image is formed facing down.

Subsequently, when the printing material is conveyed along the two-sided path 263 toward re-feed rollers 264, its passage is detected by a re-feed sensor 265 located at a position immediately before the re-feed rollers 264. When the re-feed sensor 265 detects the passage of the printing material, the convey operation is temporarily interrupted after an elapse of a predetermined period of time in this embodiment. As a result, the printing material abuts against the still re-feed rollers 264 to temporarily stop its convey operation. In this case, the position of the printing material is fixed so that its edge portion in the traveling direction is perpendicular to the convey path, thus correcting any skew of the printing material whose convey direction deviates from the convey path in a re-feed path. This process will be referred to as position re-correction hereinafter.

The position re-correction is required to minimize a subsequent tilt of the image forming direction with respect to the reverse face of the printing material. By activating the re-feed rollers 264 after the position re-correction, the printing material is conveyed onto a feed path 266 again while the obverse and reverse faces are reversed. The subsequent image forming operation is the same as that on the obverse face described above, and a description thereof will not be repeated. The printing material having images formed on the obverse and reverse faces is discharged onto the discharge tray 242 when the discharge flapper 257 switches the convey path to the discharge path 258 side.

Note that in this image forming unit 300, printing materials can be continuously fed in a two-sided print mode as well. However, since the image forming unit 300 has only one system of devices used to form an image on a printing material and to fix a formed toner image, images cannot be simultaneously printed on the obverse and reverse faces. Therefore, in the two-sided print mode, the image forming unit 300 alternately forms images on a print material fed from one of the trays 240 and 241 and manual insert tray 253 and that which is reversed for reverse face printing and is re-fed into the image forming unit.

Figure 2:
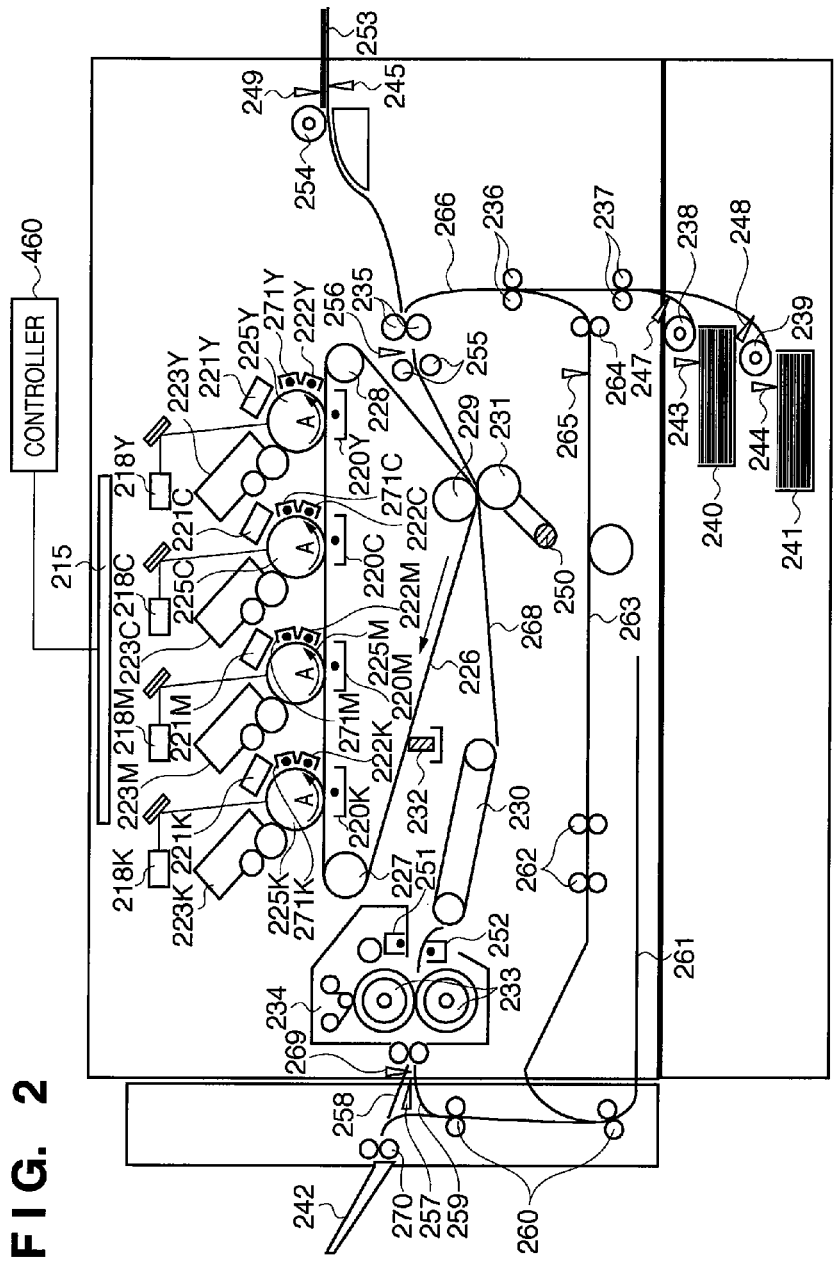
FIG. 2 is a sectional view showing an example of the arrangement of an image forming unit 300 according to the embodiment.

In the image forming unit 300, respective loads shown in FIG. 2 are classified into four control blocks, i.e., a convey module A 280, convey module B 281, image formation module 282, and fixing module 283 (to be described later), which are autonomously controlled. Furthermore, the image forming unit 300 has a master module 284 which integrates these four control blocks to function as the image forming apparatus. The control arrangements of the respective modules will be described below with reference to FIG. 3.

Figure 3:
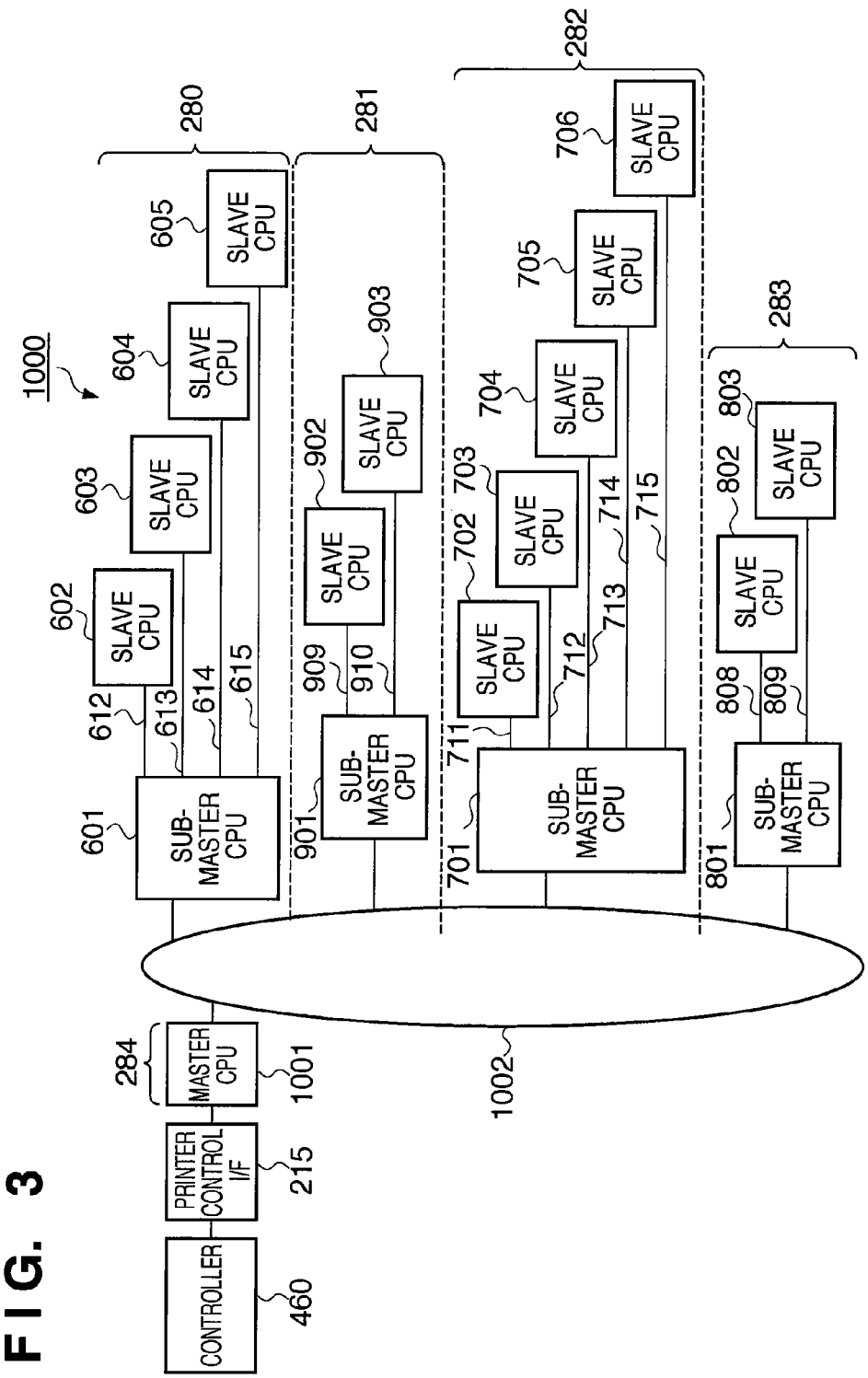
FIG. 3 is a diagram illustrating the relationship among a master CPU, sub-master CPUs, and slave CPUs according to the embodiment.

As shown in FIG. 3, in this embodiment, a master CPU (master control unit) 1001 included in the master module 284 controls the overall image forming apparatus 1000 based on instructions and image data supplied from the controller 460 via the printer control I/F 215. The convey module A 280, convey module B 281, image formation module 282, and fixing module 283 used to perform image formation respectively include sub-master CPUs (sub-master control units/upper layer control units) 601, 901, 701, and 801 used to control the respective functions. The sub-master CPUs 601, 901, 701, and 801 are controlled by the master CPU 1001.

Furthermore, the respective function modules include slave CPUs (slave control units/lower layer control units) 602, 603, 604, 605, 902, 903, 702, 703, 704, 705, 706, 802, and 803, which are used to operate the loads required to perform the respective functions. The slave CPUs 602, 603, 604, and 605 are controlled by the sub-master CPU 601, the slave CPUs 902 and 903 are controlled by the sub-master CPU 901, the slave CPUs 702, 703, 704, 705, and 706 are controlled by the sub-master CPU 701, and the slave CPUs 802 and 803 are controlled by the sub-master CPU 801.

As shown in FIG. 3, the master CPU 1001 and the plurality of sub-master CPUs 601, 701, 801, and 901 are bus-connected via a common network type communication bus (first signal line) 1002. The sub-master CPUs 601, 701, 801, and 901 are also bus-connected via the network type communication bus (first signal line) 1002. Note that the master CPU 1001 and the plurality of sub-master CPUs 601, 701, 801, and 901 may be ring-connected. The sub-master CPU 601 is further one-to-one (peer-to-peer) connected to the plurality of slave CPUs 602, 603, 604, and 605 via high-speed serial communication buses (second signal lines) 612, 613, 614, and 615, respectively. Likewise, the sub-master CPU 701 is connected to the plurality of slave CPUs 702, 703, 704, 705, and 706 via high-speed serial communication buses (second signal lines) 711, 712, 713, 714, and 715, respectively. The sub-master CPU 801 is connected to the slave CPUs 802 and 803 via high-speed serial communication buses (second signal lines) 808 and 809, respectively. The sub-master CPU 901 is connected to the slave CPUs 902 and 903 via high-speed serial communication buses (second signal lines) 909 and 910, respectively. Note that each high-speed serial communication bus is used in short-distance high-speed communications.

In the image forming apparatus 1000 according to this embodiment, the control which requires responses depending on timings is functionally divided to be implemented in the respective function modules controlled by the respective sub-master CPUs. For this reason, a communication between each slave CPU, which is required to drive a distal load, and each sub-master CPU is connected using the high-speed serial communication bus with a high response. That is, each second signal line uses a signal line which has higher timing accuracy of data transfer than the first signal line.

On the other hand, only exchanges which do not require any accurate control timings and control general processing sequence of an image forming operation are made between the sub-master CPUs 601, 701, 801, and 901 and the master CPU 1001. For example, the master CPU 1001 issues image formation pre-processing start, paper feed start, and image formation post-processing start instructions to the sub-master CPUs. Also, the master CPU 1001 issues an instruction based on a mode (for example, a monochrome mode, a two-sided image formation mode, etc.) instructed from the controller 460 to the sub-master CPUs before the beginning of image formation. Only exchanges which do not require any accurate timing control are also made among the sub-master CPUs 601, 701, 801, and 901. More specifically, the control of the image forming apparatus is divided into control units which do not require any accurate timing control each other, and the respective sub-master CPUs control the respective control units at accurate timings. In this way, this image forming apparatus 1000 minimizes communication traffics, and allows connections using the slow, inexpensive network type communication bus 1002. Note that the control boards used to mount the master CPU, sub-master CPUs, and slave CPUs need not always be uniform, and these CPUs may be variably laid out in correspondence with situations in terms of apparatus mounting.

Figure 4:
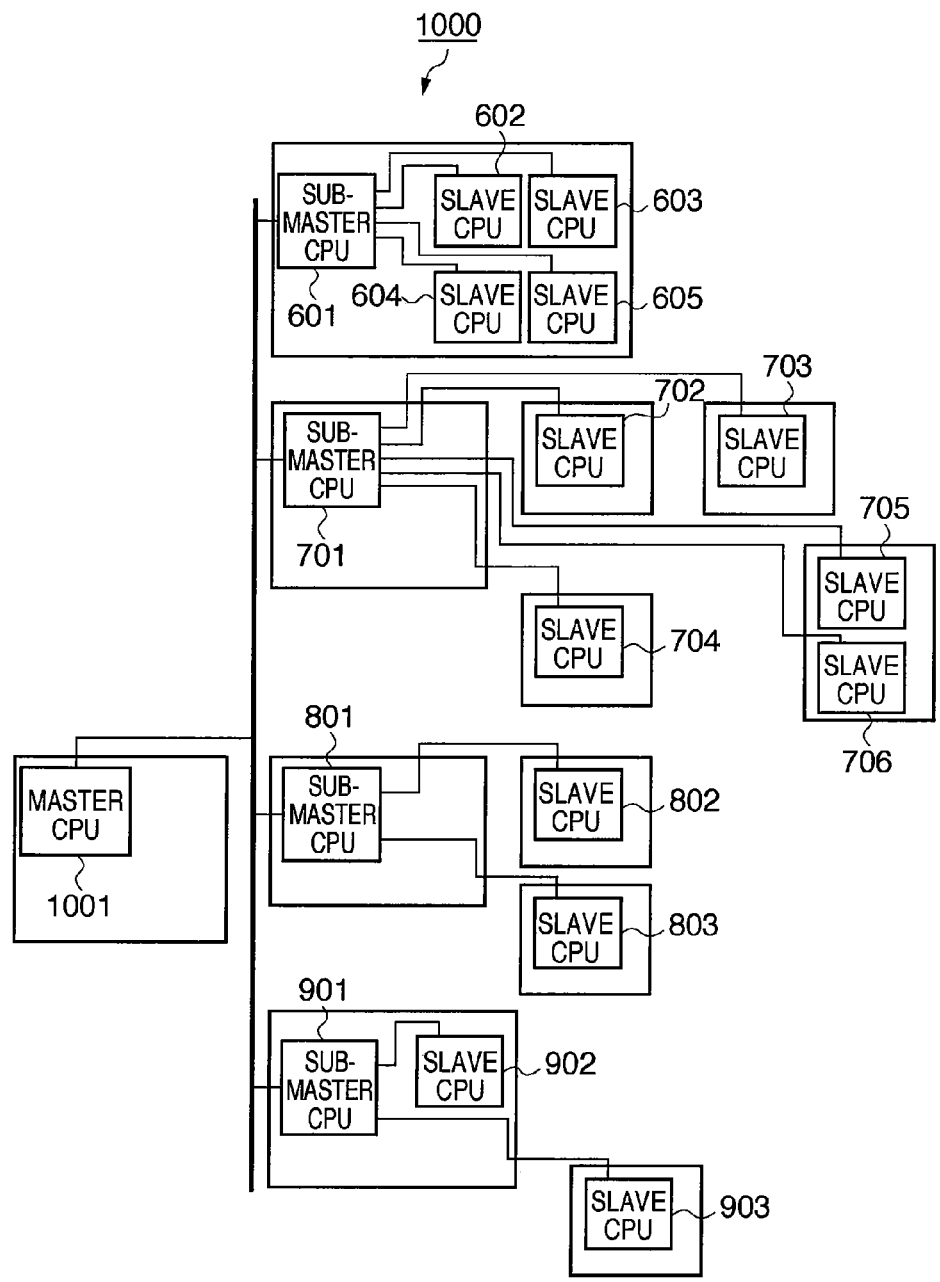
FIG. 4 is a block diagram showing an example of control boards of the image forming apparatus 1000 according to the embodiment.

Practical layouts of the master CPU, sub-master CPUs, and slave CPUs on the board arrangements in this embodiment will be described below with reference to FIG. 4. According to this embodiment, as shown in FIG. 4, various control board arrangements can be adopted. For example, the sub-master CPU 601 and the slave CPUs 602, 603, 604, and 605 are mounted on an identical board. Like the sub-master CPU 701 and the slave CPUs 702, 703, and 704, or the sub-master CPU 801 and the slave CPUs 802 and 803, the sub-master CPU and each individual slave CPU may be mounted on independent boards. Also, like the slave CPUs 705 and 706, some slave CPUs may be mounted on an identical board. Furthermore, like the sub-master CPU 901 and slave CPU 902, the sub-master CPU and only some of the slave CPUs may be laid out on an identical board.

Operation Confirmation Control

Figure 5:
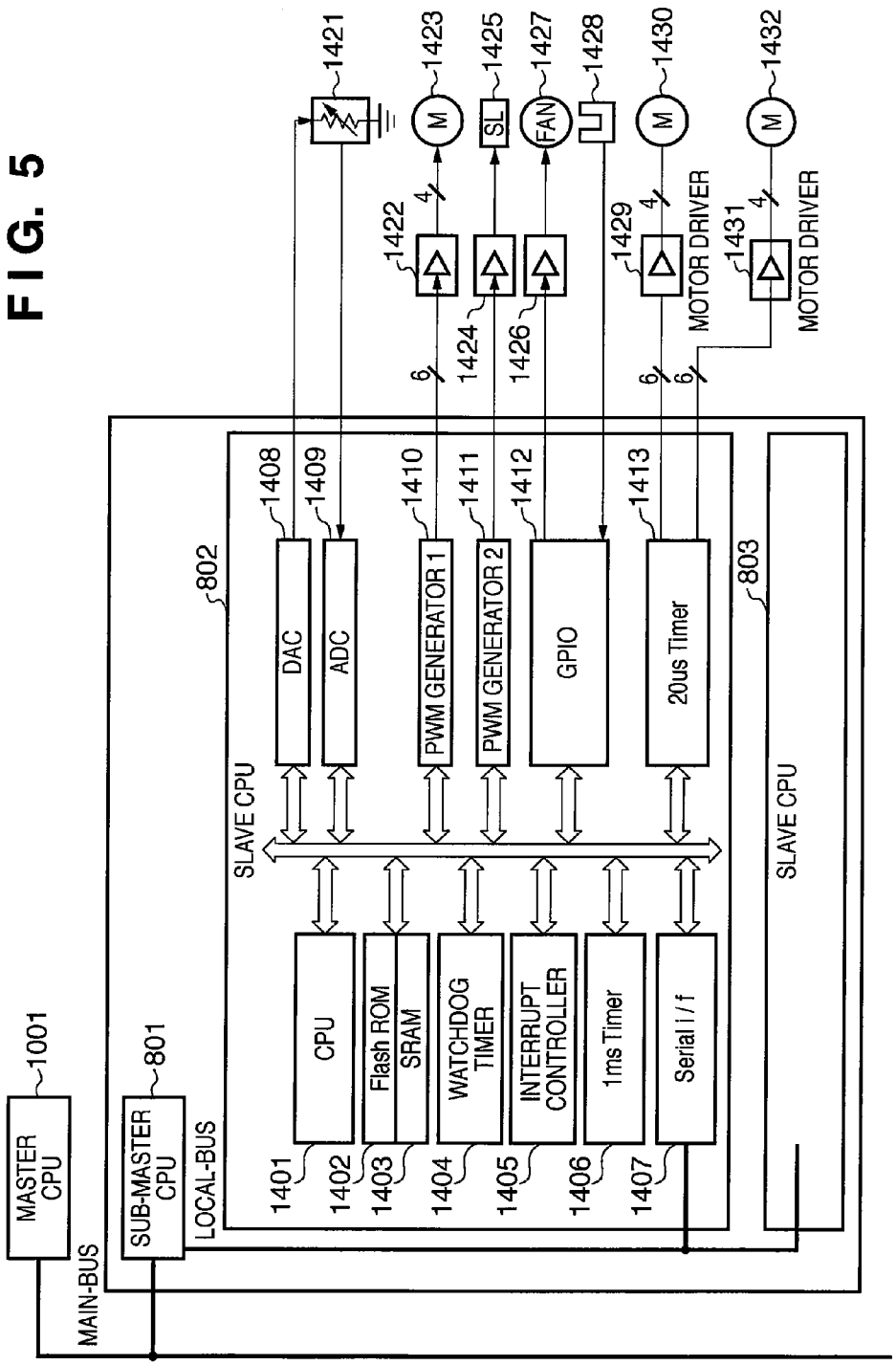
FIG. 5 is a block diagram showing an example of the arrangement of a slave CPU 802 and device connections according to the embodiment.

Operation confirmation control in the image forming apparatus to which distributed control as a characteristic feature of the present invention is applied will be described below with reference to FIGS. 5 to 11. Note that the operation confirmation control means control in which a certain control unit monitors an operation of another control unit, and performs an error detection. According to this embodiment, the control unit which monitors the operation of another active control unit is an inactive control unit. Therefore, each control unit has a monitoring unit which monitors the operation of another control unit and performs an error diagnosis. FIG. 5 is a block diagram showing an example of the arrangement of the slave CPU 802 and device connections according to this embodiment. FIG. 5 shows details of the master CPU 1001, sub-master CPU 801, and slave CPUs 802 and 803 in FIG. 3, i.e., it is a block diagram showing the internal structure and device connections of the slave CPU 802. That is, FIG. 5 shows an arrangement model of the sub-master CPU 801 and slave CPU 802. The slave CPU 802 controls devices shown in FIG. 5. However, this arrangement example is provided for descriptive purpose of the control contents, and does not reflect any actual device arrangement.

The slave CPU 802 includes a CPU 1401, flash memory 1402, SRAM 1403, watchdog timer 1404, interrupt controller 1405, general-purpose timers 1406 and 1413, serial I/F 1407, D/A converter 1408, A/D converter 1409, PWM generators 1410 and 1411, and GPIO 1412.

The CPU 1401 controls various devices using peripheral circuits according to programs. The flash memory 1402 holds programs to be performed by the CPU 1401 and data. The SRAM (Static Random Access Memory) 1403 is a work memory of the CPU 1401.

The watchdog timer 1404 monitors the operation state of the CPU 1401. The interrupt controller 1405 is used to accept an interrupt factor, which prompts the CPU 1401 to interrupt processing and to switch the processing in response to an internal state change of, e.g., a serial communication or a change in signal from an external IO, and to perform processing conforming to the state change. The general-purpose timer 1406 is used to generate interrupts at 1-ms cycles. The general-purpose timer 1413 is used to generate high-speed cycle interrupts required to generate motor driving signals. In this example, the general-purpose timer 1413 generates interrupts at 20-µs cycles.

The serial I/F 1407 makes serial communications between the sub-master CPU 801 and slave CPU 803. The D/A converter 1408 converts a digital signal into an analog signal, and includes a plurality of channels. The A/D converter 1409 converts an analog signal into a digital signal, and includes a plurality of channels.

The PWM (Pulse Width Modulation) generators 1410 and 1411 generate PWM signals using the general-purpose timers. The GPIO (General Purpose I/O) 1412 has a plurality of general-purpose input/output ports.

Respective loads connected to the slave CPU 802 will be described below. Reference numeral 1421 denotes an analog sensor which outputs a detection value as an analog value. Reference numeral 1422 denotes a motor driver which updates a motor exciting pattern according to an input clock frequency, and drives a stepping motor. Reference numerals 1423, 1430, and 1432 denote stepping motors each of which includes a plurality of coils and is rotated according to a current pattern flowing through the coils. Reference numeral 1424 denotes a solenoid driver which converts an input voltage into a current to drive a solenoid. Reference numeral 1425 denotes a solenoid which generates a magnetic field according to a current flowing through a coil so as to attract an internal actuator. Reference numeral 1426 denotes a fan driver which converts an input voltage into a current to drive a fan. Reference numeral 1427 denotes a device cooling fan. Reference numeral 1428 denotes a photointerrupter which is formed by an LED (Light-Emitting Diode) and phototransistor, and whose output changes according to incident light on the phototransistor. Reference numerals 1429 and 1431 denote motor drivers which update motor exciting patterns according to a plurality of input phase exciting pattern signals.

FIG. 5 illustrates that control signals to the motor drivers are connected to the 20-μs general-purpose timer 1413. However, this merely indicates that firmware stored in the flash memory 1402 generates timing signals using interrupts from the general-purpose timer 1413 in which generation of timing signals to the motor driver 1422 is set at 20-μs cycles. In practice, these control signals are connected to the ports of the GPIO 1412.

Stepping Motor Control

The processing contents of the CPU 1401 will be described below. Stepping motor control will be described first with reference to FIG. 6.

The CPU 1401 of the slave CPU 802 updates driving signals to the motor driver 1422 at the cycles of the general-purpose timer 1413. The CPU 1401 performs acceleration/deceleration control of the stepping motors 1423, 1430, and 1432 by controlling the driving signals to the motor driver 1422 while exchanging control information with the sub-master CPU 801 via the serial I/F 1407.

Figure 6:
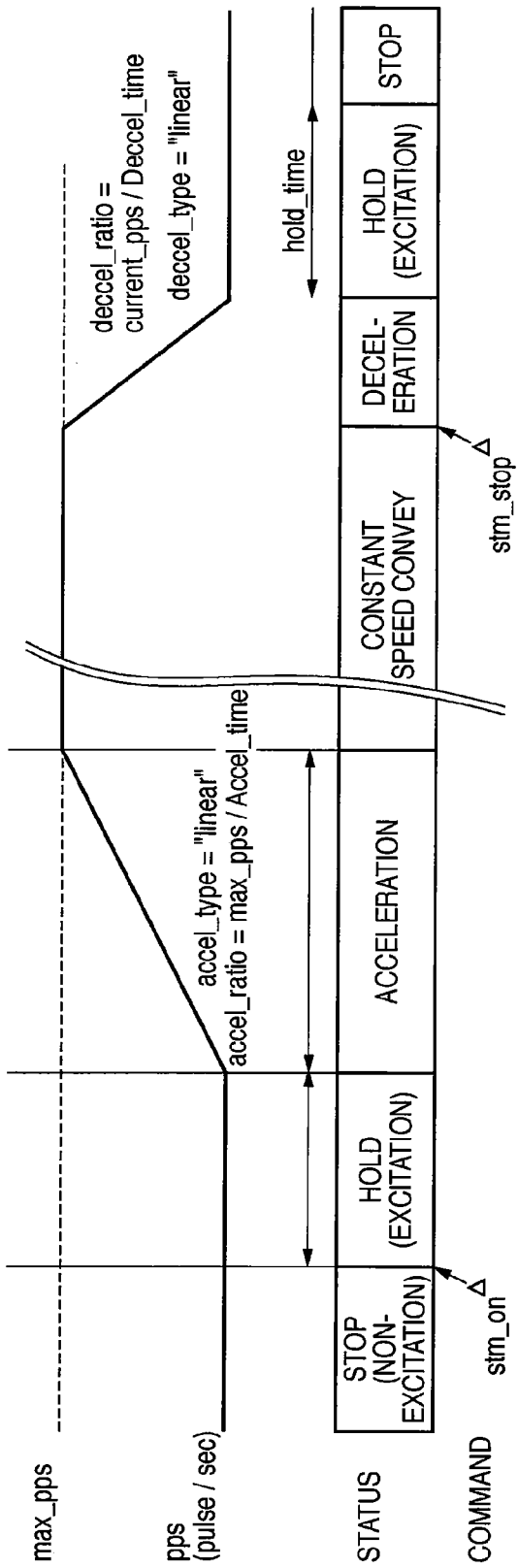
FIG. 6 is a chart for explaining stepping motor control in a CPU 1401 according to the embodiment.

As shown in FIG. 6, stm_on and stm_stop commands represent instruction commands from the sub-master CPU 801 to the slave CPU 802. Upon reception of the stm_on command in a motor halt state, the CPU 1401 performs initial hold processing, accelerates the motor, and then performs constant speed convey processing. Upon reception of the stm_stop command during the constant speed convey processing, the CPU 1401 decelerates the motor, and turns off excitation after hold processing.

Solenoid Driving

Figure 7:
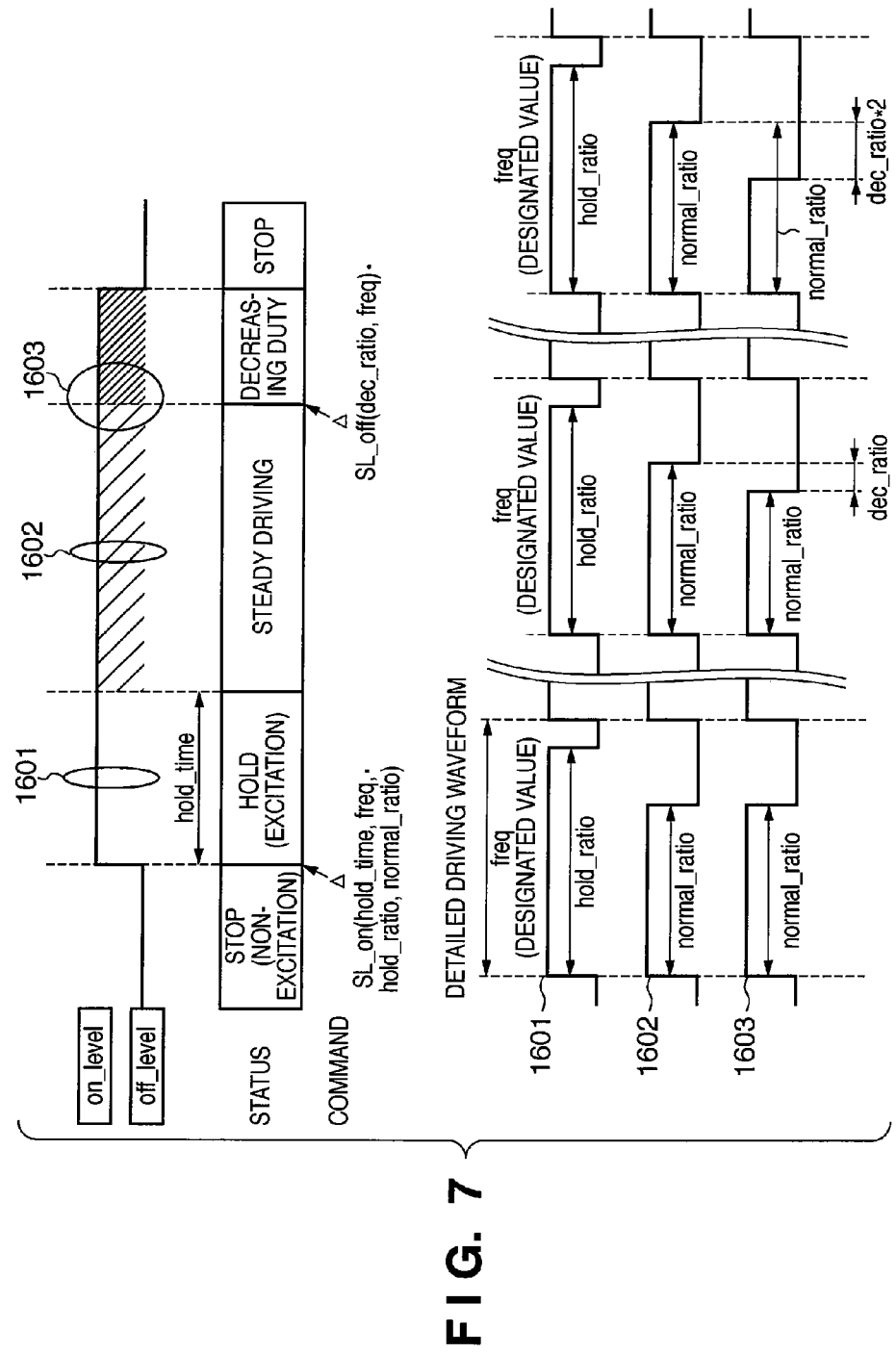
FIG. 7 is a chart for explaining solenoid driving in the CPU 1401 according to the embodiment.

Solenoid driving will be described below with reference to FIG. 7. As shown in FIG. 7, SL_on and SL_off commands represent instruction commands from the sub-master CPU 801 to the slave CPU 802.

Upon reception of the SL_on command, the CPU 1401 performs PWM driving using a hold duty waveform 1601. After an elapse of a hold time period, the CPU 1401 continues driving using a steady driving duty waveform 1602. On the other hand, upon reception of the SL_off command, the CPU 1401 controls the solenoid to an excitation OFF state while gradually decreasing an ON duty, as shown in a waveform 1603. In this case, the ON duty is updated at 1-ms cycles.

Port Control

Figure 8:
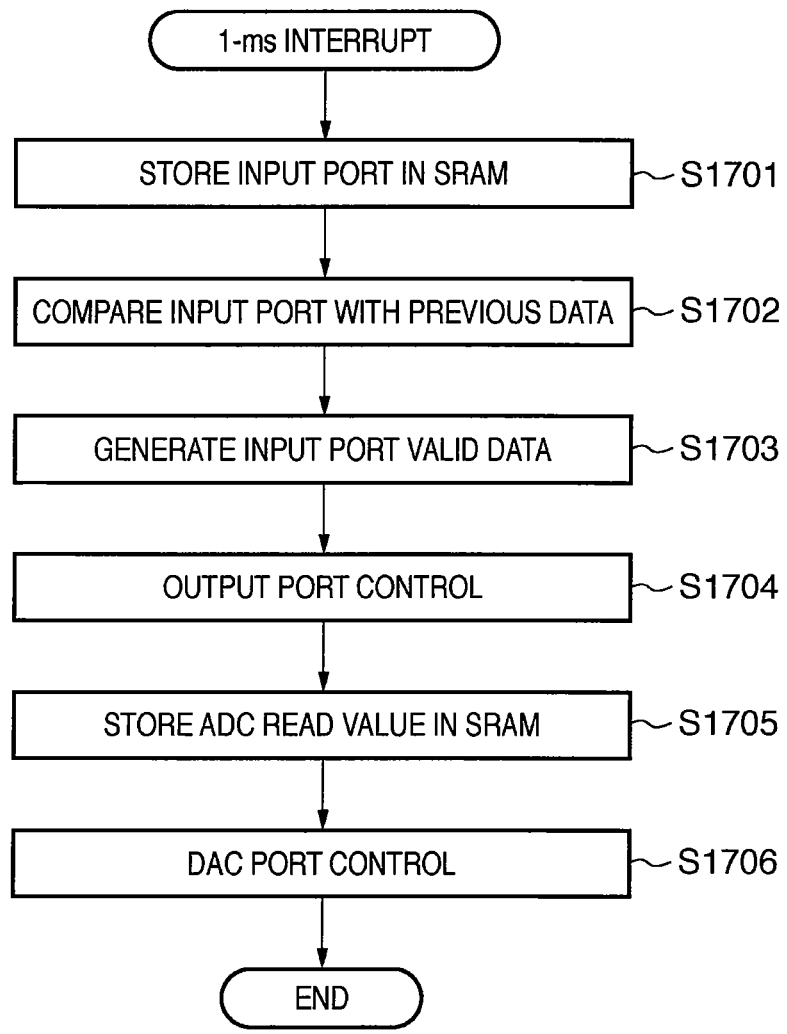
FIG. 8 is a flowchart for explaining port control in the CPU 1401 according to the embodiment.

Port control will be described below with reference to FIG. 8. The processing to be described below is generally controlled by the CPU 1401 of the slave CPU 802.

The CPU 1401 performs control of the GPIO 1412, input control of the A/D converter 1409, and output control of the D/A converter 1408. Input/output update cycles are decided by those of the 1-ms counter. A value to be output follows an instruction notified from the sub-master CPU 801. A level of an input signal is sequentially transmitted to the sub-master CPU 801 according to an instruction from the sub-master CPU 801.

Upon generation of an interrupt of the 1-ms counter, the CPU 1401 stores the input level of the input port defied in an input by the GPIO 1412 in the SRAM 1403 in step S1701. In step S1702, the CPU 1401 compares the input level stored in step S1701 with the previously stored input level of the input port. If there is no change based on the comparison result in step S1702, the CPU 1401 then updates the input level as VALID data in step S1703. This comparison processing is performed to prevent detection errors due to noise superposed on an external input signal or when input signals change at the same time at the time of reading. The number of times of confirmation to attain VALID settlement based on whether or not an identical level is continuously input may be changed depending on the types of input signals.

Next, the CPU 1401 updates an output value of the output port of the GPIO 1412 according to an output value designated by the sub-master CPU 801 in step S1704.

Subsequently, the CPU 1401 stores the input value from the A/D converter 1409 in the SRAM 1403 in step S1705. Furthermore, the CPU 1401 performs output update processing of the D/A converter 1408 as in the input/output control of the GPIO 1412 in step S1706.

As described above, the CPU 1401 performs the output control of the GPIO 1412 and the output update processing of the D/A converter 1408 based on instructions from the sub-master CPU 801, and transmits all of input values from the GPIO 1412 and A/D converter 1409 to the sub-master CPU 801. Depending on the control contents, the CPU 1401 may execute the output value control of the GPIO 1412 and the output update processing of the D/A converter 1408 upon changes in input or control state.

Figure 9:
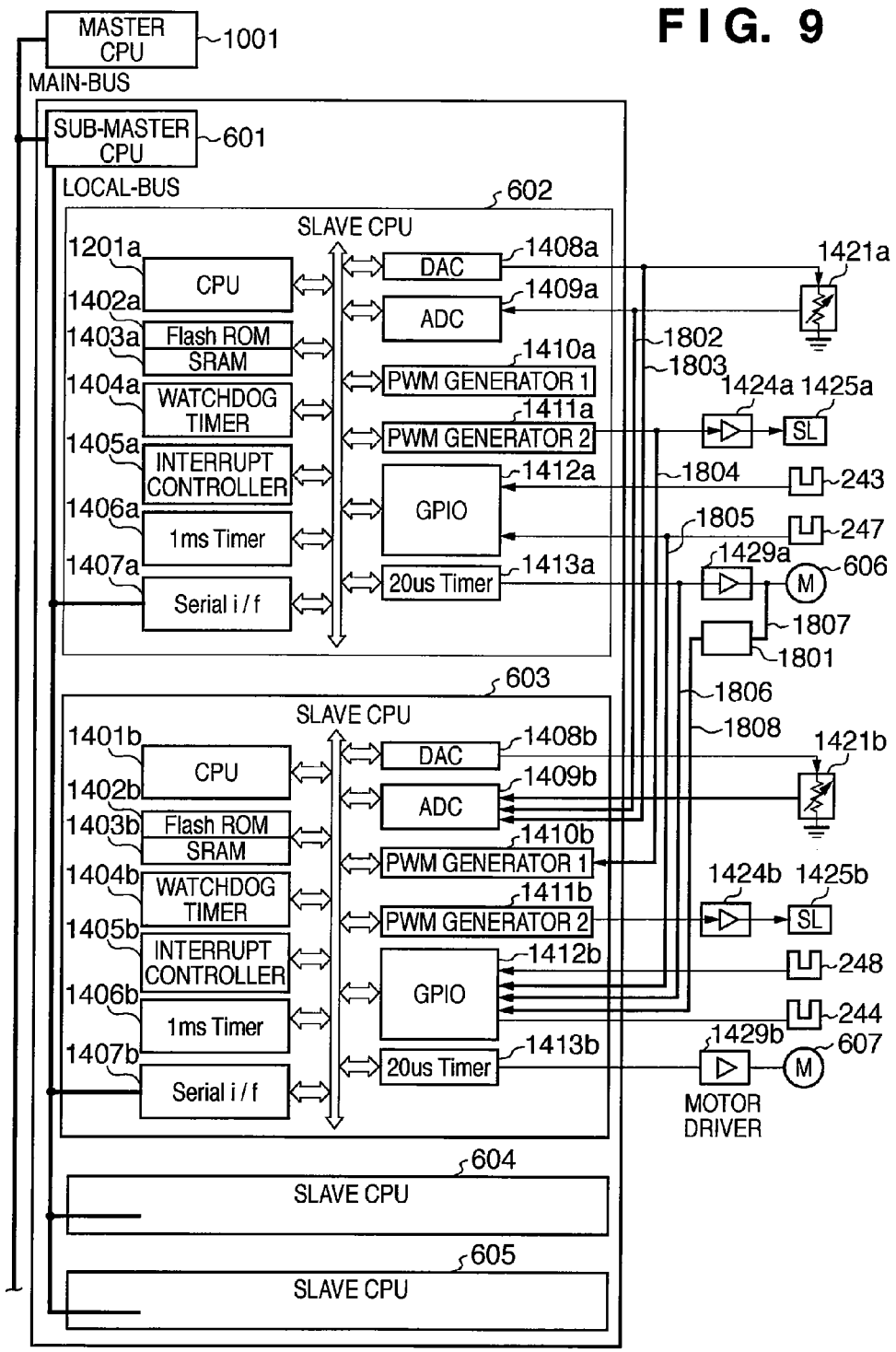
FIG. 9 is a block diagram showing an example of the arrangements of slave CPUs 602 and 603 and device connections according to the embodiment.

FIG. 9 is a block diagram showing details of the master CPU 1001, sub-master CPU 601, and slave CPUs 602 to 605, and the detailed structures of the slave CPUs 602 and 603 and device connections. Reference numerals of the internal components of the slave CPU 602 and devices connected to the slave CPU 602 have suffix "a". Also, reference numerals of the internal components of the slave CPU 603 and devices connected to the slave CPU 603 have suffix "b".

The slave CPU 602 performs control until a printing material is delivered the feed path 266 to have, as loads, a driving source motor 606 for driving the pickup roller 238 associated with the tray 240, the sheet absence sensors 243, and the paper feed sensor 247. The slave CPU 603 performs control until a printing material is delivered to the feed path 266 to have, as loads, a driving source motor 607 for driving the pickup roller 239 associated with the tray 241, the sheet absence sensor 244, and the paper feed sensor 248.

In order to confirm the operation of the slave CPU 602 by the slave CPU 603, some connection lines (signal lines) between the slave CPU 602 and controlled devices are connected to the slave CPU 603 for the purpose of operation confirmation. A connection diagram for confirmation indicates connections that allow the slave CPU 603 to monitor connected portions between the slave CPU 602 and devices for the sake of simplicity. However, in practice, connected portions between the slave CPU 603 and devices are connected to allow the slave CPU 602 to monitor them, so that the slave CPUs 602 and 603 can monitor each other's operations. The connected portions will be described below. Note that the arrangement of each slave CPU is the same as that described using FIG. 5, and a description thereof will not be repeated.

Reference numeral 1802 denotes a connection line used to also allow an A/D converter 1409b to monitor an output from an analog sensor 1421a. Reference numeral 1803 denotes a connection line used to allow the A/D converter 1409b to monitor a reference voltage output from a D/A converter 1408a to the analog sensor 1421a. Reference numeral 1804 denotes a connection line used to connect a PWM waveform from a PWM generator 1411a to a PWM generator 1410b. Reference numeral 1805 denotes a connection line used to input a state signal from the paper feed sensor 247 to a GPIO 1412b. Reference numeral 1806 denotes a connection line used to allow the GPIO 1412b to monitor a control input of a motor driver 1429a. Reference numeral 1807 denotes a control line used to monitor an output from the motor driver 1429a. The control line 1807 is connected to the GPIO 1412b via a voltage converter 1801 and a connection line 1808.

The slave CPUs 602 and 603 control processes for picking up printing materials from different paper feed trays (paper feed units) and conveying the printing materials. Therefore, these two slave CPUs 602 and 603 basically perform exclusive operations.

The operation states of the respective slave CPUs 602 to 605 during execution of a print job will be described below with reference to FIG. 10. Reference numerals 1901 to 1904 denote operation states of the slave CPUs 602 to 605 along the time axis during execution of a print job. Reference numeral 1905 denotes a sheet convey status which represents a convey state of a printing sheet.

When a print job is generated, the sub-master CPU 601 issues operation instructions to the slave CPUs 602, 603, 604, and 605 in accordance with an instruction from the master CPU 1001 so as to attain cooperative operations. When the paper feed tray 240 is selected as a paper feed source, the sub-master CPU 601 instructs the slave CPU 602 to pick up a printing sheet.

According to this instruction, the slave CPU 602 starts driving of a motor 606 and solenoid 1425a to pick up a printing sheet. After the printing sheet is picked up and is normally conveyed, the state of the paper feed sensor 247 changes to a sheet detection state (rise). The information of the paper feed sensor is supplied to the sub-master CPU 601, and the sheet convey status 1905 changes from a paper-feed/pickup state to a pre-printing convey state.

The sub-master CPU 601 instructs the slave CPU 605 to convey the printing sheet. The slave CPU 605 starts driving of motors 609 to 611, and continues driving of the motors 609 to 611 until the state of the registration sensor 256 changes. Upon notification of a change in state of the registration sensor 256 to a sheet detection state (rise), the sub-master CPU 601 instructs the slave CPUs 602 and 605 to temporarily stop the motors, and changes the sheet convey status 1905 to a printing preparation status.

When print data is ready, the sub-master CPU 601 instructs the slave CPUs 602 and 605 to re-drive the motors, and changes the sheet convey status 1905 to a printing processing state. When the state of the paper feed sensor 247 changes to a sheet absent state (fall) in this printing processing, the slave CPU 602 stops driving of the motor 606 and solenoid 1425a. Furthermore, upon detection of a change in state of the registration sensor 256 to a sheet absent state (fall), the slave CPU 605 stops driving the motors 609 to 611 after an elapse of a predetermined period of time. After that, the secondary transfer device 231 and fixing device 234 form and fix an image on the printing sheet, and the printing sheet is discharged from the discharge path 258 side onto the discharge tray 242, thus completing the print job.

As described above, in the print job, a printing sheet is fed from only one paper feed tray per job. That is, since the slave CPUs 602 and 603 which control paper feed processes of printing sheets exclusively operate, when the slave CPU 602 operates, the slave CPU 603 is set in an idle state in which the slave CPU 603 monitors only acquisition of input/output port information and notifications from the sub-master CPU 601.

Figure 10:
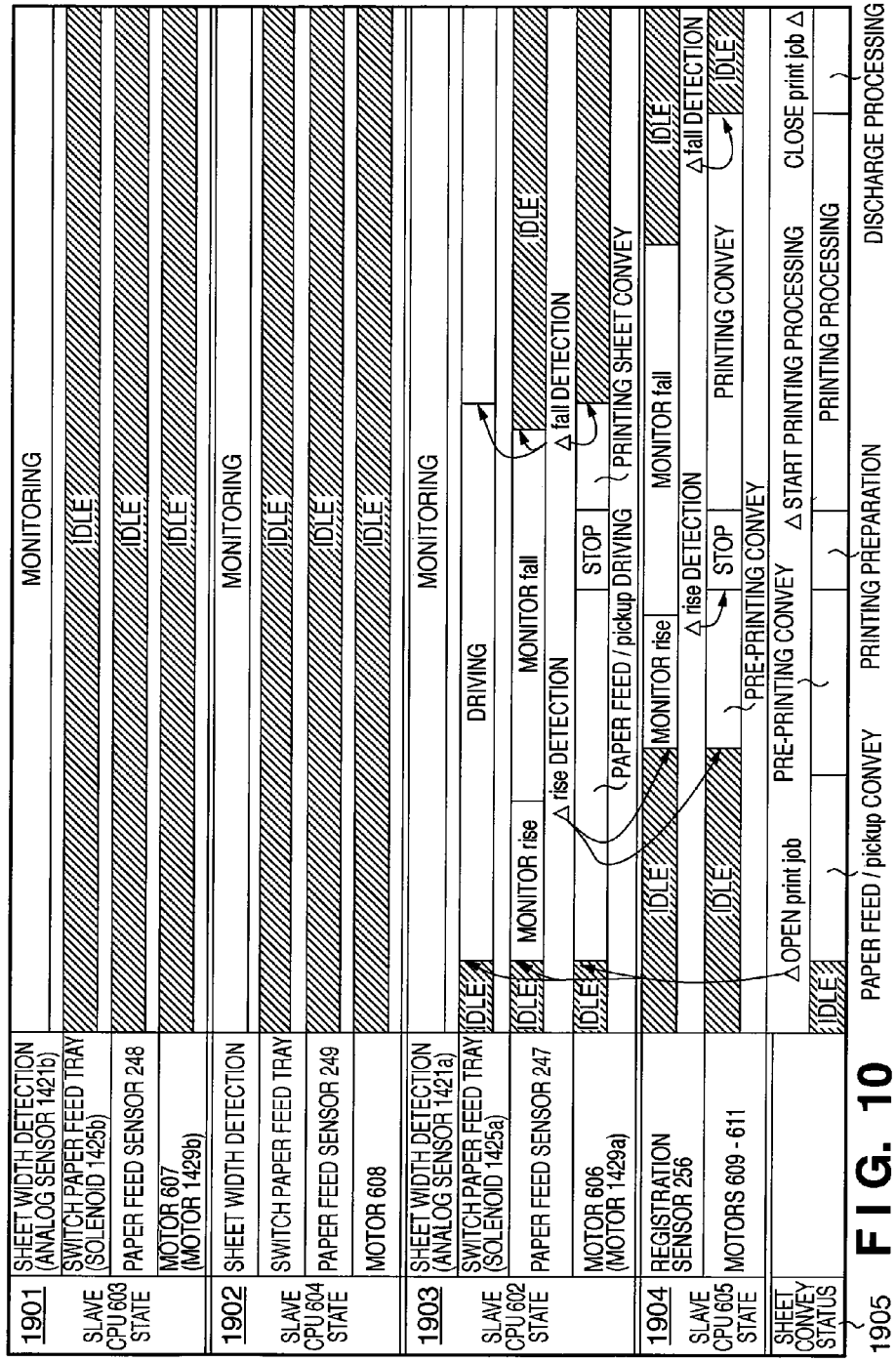
FIG. 10 is a chart showing operation states of slave CPUs according to the embodiment.

In FIG. 10, an idle period of each slave CPU is hatched for each operation type. According to this embodiment, the slave CPU in the idle state performs processing for monitoring the operation of the active slave CPU using the aforementioned connection lines for mutual confirmation. The mutual confirmation operation will be described below.

The sub-master CPU 601 and each slave CPU are connected via one transmission path (connection line). Also, a unique node ID is assigned to each individual connected device. Each slave CPU (each node) reads an ID appended to a communication message from the sub-master CPU, receives the communication message with the ID that matches the self ID, and performs processing. According to this embodiment, the slave CPU in the idle state reads a communication message between the slave CPU to be monitored and the sub-master CPU even when the ID of the communication message does not match the self ID but when it matches that of the slave CPU to be monitored, thereby monitoring instructions from the sub-master CPU to the slave CPU and notifications to the sub-master CPU. The confirmation method of the operation of the slave CPU with respect to each individual device will be described below. The following description will be given under the assumption that the slave CPU 602 is active, and the slave CPU 603 is in the idle state.

As shown in FIG. 9, the slave CPU 603 monitors the output from the analog sensor 1421a via the connection line 1802 while converting it into a digital signal using the A/D converter 1409b. Furthermore, the slave CPU 603 compares transmission information from the slave CPU 602 to the sub-master CPU 601 with the information monitored via the A/D converter 1409b to monitor whether or not the slave CPU 602 normally operates.

The slave CPU 603 monitors a reference voltage output from D/A converter 1408a to the analog sensor 1421a via the connection line 1803 while converting it into a digital signal using the A/D converter 1409b. Furthermore, the slave CPU 603 compares an instruction from the sub-master CPU 601 to the slave CPU 602 with the information monitored via the A/D converter 1409b to confirm if a reference voltage is output according to the instruction from the sub-master CPU 601.

The connection line 1804 is connected to input a PWM waveform from the PWM generator 1411a to the PWM generator 1410b. Then, the slave CPU 603 tests an H pulse width and L pulse width using a periodic capture function of an external signal of the PWM generator 1410b. Also, the connection line 1805 is connected to input a state signal from the paper feed sensor 247 to the GPIO 1412b. Then, the slave CPU 603 confirms whether or not a notification from the slave CPU 602 to the sub-master CPU 601 is normal.

Furthermore, the slave CPU 603 monitors a control input of the motor driver 1429a using the GPIO 1412b via the connection line 1806 to confirm if the motor driver 1429a operates at normal cycles. Or the slave CPU 603 may adopt a method of generating a driving waveform according to an instruction from the sub-master CPU 601 to the slave CPU 602 and comparing it with an input value input via the connection line 1806. Furthermore, the slave CPU 603 connects an output of the motor driver 1429a to the GPIO 1412b via the connection line 1807, voltage converter 1801, and connection line 1808 and confirms if the motor driver operates according to a designation on the connection line 1806. Also, the slave CPU 603 may monitor communications between the sub-master CPU 601 and slave CPU 602 to indirectly monitor the operation state of the sub-master CPU 601.

In the aforementioned example, communications between other nodes are monitored by performing pseudo-switching of the self node. However, the present invention is not limited to this, and the same effects can be obtained by uniquely defining communication data types defined on communication message packets for respective nodes, and adding a message packet to be received.

The case has been exemplified wherein the slave CPU 603 monitors the operation of the slave CPU 602. However, the present invention is not limited to this. For example, the slave CPUs 602 and 605, the operation sequences of which include non-overlapping portions of loads, may monitor each other's operations while switching ranges that can be monitored according to their load statuses.

As shown in FIG. 10, the slave CPUs 602 and 605 include portions in which they operate at the same time, and those in which only one of them operates. For example, in the paper-feed/pickup convey state of the sheet convey status 1905, since motor driving of the slave CPU 605 is in an idle state, the slave CPU 605 can monitor the motor operation of the slave CPU 602. In the latter half of printing processing in the sheet convey status 1905, since motor driving of the slave CPU 602 is in an idle state, the slave CPU 602 may monitor the motor driving state of the slave CPU 605 during this period.

In this manner, when each other's operations are confirmed according to the load statuses and resource use statuses, accurate operation confirmation can be performed without adding any slave CPU for monitoring. When such hardware used to perform operation confirmation is added, the hardware arrangement is complicated, and confirmation hardware has to be added, thus causing an increase in cost. Also, it is difficult to flexibly change the confirmation method in correspondence with various devices. On the other hand, when operation confirmation is performed using software, the confirmation program can be easily changed to be applied to confirmation of various contents. Also, since the error check contents are changed according to the CPU load statuses, both higher degrees of freedom in confirmation and detailed diagnosis during operation and low cost can be achieved.

Figure 11A:
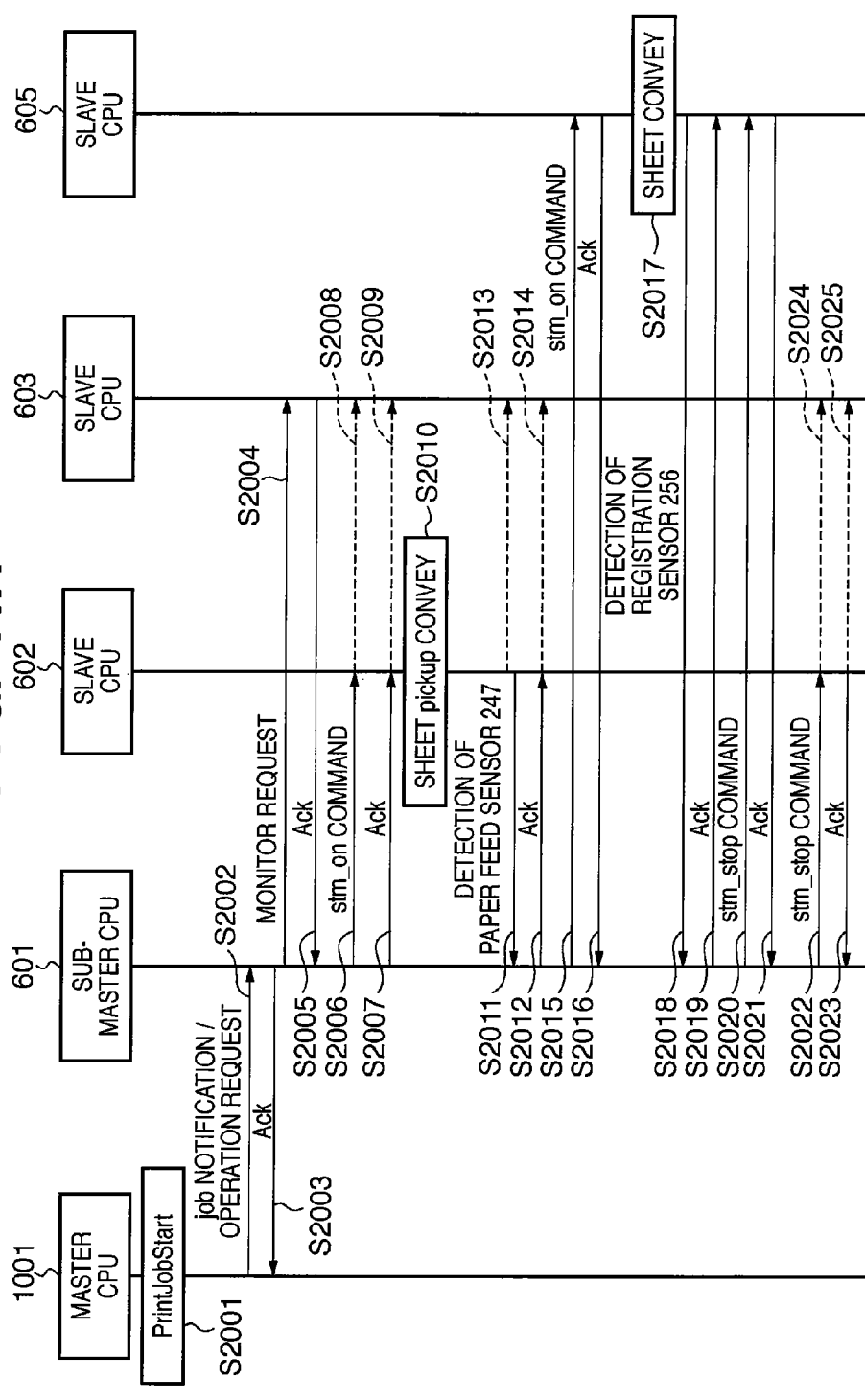

A command sequence in the operation confirmation mode according to this embodiment will be described below with reference to FIGS. 11A and 11B. The processes of the master CPU 1001, sub-master CPU 601, and slave CPUs 602, 603, and 605 upon execution of a print job will be described.

When a print job start instruction is accepted from the user in step S2001, the master CPU 1001 starts a print job, and sends a job notification and operation request to the sub-master CPU 601 in step S2002. Then, in step S2003, the sub-master CPU 601 notifies the master CPU 1001 of a response (Ack). Furthermore, in step S2004, the sub-master CPU 601 requests the slave CPU 603 to monitor the operation of the slave CPU 602. In this case, since it is premised on that the paper feed control is performed via the slave CPU 602, the sub-master CPU 601 notifies the slave CPU 603 of the monitor request. In step S2005, the slave CPU 603 notifies the sub-master CPU 601 of a response to the monitor request.

In step S2006, the sub-master CPU 601 notifies the slave CPU 602 of a request (stm_on command) to drive the motor and to perform a sheet pickup convey operation. In response to this request, the slave CPU 602 notifies the sub-master CPU 601 of Ack in step S2007. In steps S2008 and S2009, the slave CPU 603 monitors communications between the sub-master CPU 601 and slave CPU 602. In FIGS. 11A and 11B, the monitor operations of the slave CPU 603 are indicated by dotted arrows like in steps S2008 and S2009.

In step S2010, the slave CPU 602 drives the motor 607 to perform the sheet pickup convey operation. Then, the slave CPU 602 performs the sheet convey operation. Upon detection of a level change (sheet detection state: rise) of the paper feed sensor 247, the slave CPU 602 notifies the sub-master CPU 601 of the status change of the paper feed sensor 247 in step S2011. In response to this notification, the sub-master CPU 601 notifies the slave CPU 602 of Ack in step S2012. Note that the slave CPU 603 monitors commands transmitted and received between the sub-master CPU 601 and slave CPU 602 in steps S2013 and S2014.

Upon reception of the notification of the level change of the paper feed sensor 247, the sub-master CPU 601 notifies the slave CPU 605 of a driving start instruction (stm_on command) of the motors 609 to 611 in step S2015. In response to this instruction, the slave CPU 605 notifies the sub-master CPU 601 of Ack in step S2016. Furthermore, the slave CPU 605 starts driving the motors in step S2017. After that, upon detection of a change of the registration sensor 256 (sheet detection state: rise), the slave CPU 605 notifies the sub-master CPU 601 of the status change of the registration sensor 256 in step S2018. In response to this notification, the sub-master CPU 601 notifies the slave CPU 605 of Ack in step S2019.

In steps S2020 and S2022, the sub-master CPU 601 notifies the slave CPU 605 of a driving stop instruction (stm_stop command) of the motors 609 to 611 and the slave CPU 602 of a driving stop instruction of the motor 607. In response to these notifications, the slave CPUs 605 and 602 respectively notify the sub-master CPU 601 of Ack in steps S2021 and S2023. Note that the slave CPU 603 monitors commands transmitted and received between the sub-master CPU 601 and slave CPU 602 in steps S2024 and S2025.

Assume that the slave CPU 603 detects in step S2026 that, for example, the slave CPU 602 continues to drive the motor 607 although it receives the stop command. Then, the slave CPU 603 notifies the sub-master CPU 601 of an error in step S2027. In response to this notification, the sub-master CPU 601 notifies the slave CPU 603 of Ack in step S2028.

Upon reception of the error notification, the sub-master CPU 601 notifies the master CPU 1001 of detection of an abnormality in step S2029. In response to this notification, the master CPU 1001 notifies the sub-master CPU 601 of Ack in step S2030, and controls the console 10 to display information of detection of an abnormality as an error in step S2031.

In step S2032, the sub-master CPU 601 issues a reset request by means of a hardware or software command to the slave CPU 602 to perform emergency stop of the motor, thus prompting the slave CPU 602 to perform the emergency stop of the motor. Also, the sub-master CPU 601 performs forced OFF processing of a motor power source. In response to this request, the slave CPU 602 notifies the sub-master CPU 601 of Ack in step S2033. Note that the slave CPU 603 monitors commands transmitted and received between the sub-master CPU 601 and slave CPU 602 in steps S2034 and S2035.

In steps S2036 and S2040, the sub-master CPU 601 notifies the slave CPUs 602 and 603 of a detailed diagnosis request. In response to these notifications, the slave CPUs 602 and 603 respectively notify the sub-master CPU 601 of Ack in steps S2037 and S2041, and perform a detailed diagnosis in cooperation with each other in step S2042. The detailed diagnosis in this case specifies, for example, error contents and an error portion.

After that, the slave CPUs 602 and 603 notify the sub-master CPU 601 of error information including error contents and an error portion as their determination results in steps S2043 and S2045. In response to the error information, the sub-master CPU 601 respectively notifies the slave CPUs 602 and 603 of Ack in steps S2044 and S2046. Furthermore, the sub-master CPU 601 collates the notification results of the respective slave CPUs to determine a failure portion in detail, and notifies the master CPU 1001 of the result in step S2047. In step S2048, the master CPU 1001 receives the result notification, and informs the user of details of the error contents (for example, it displays them on the display unit), thus supporting the user to easily restore errors.

As described above, in the image forming apparatus according to this embodiment, an inactive slave CPU monitors the operation of another active slave CPU to perform an error diagnosis. More specifically, this image forming apparatus monitors commands transmitted and received among the other slave CPU, another CPU, and a load to perform the error diagnosis. For this reason, for example, the slave CPU has signal lines used to monitor the commands. In this way, the image forming apparatus implements distributed control using the plurality of CPUs, and can perform an error detection as concern in the distributed control system without adding any dedicated monitoring module (including hardware and software). Then, an increase in cost, which is a problem when the image forming apparatus adopts a distributed control system using a plurality of CPUs, can be suppressed.

Note that in the aforementioned embodiment, the operation confirmation control between the slave CPUs has been described. However, the present invention is not limited to this, and such control can also be applied to the master CPU and sub-master CPUs.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063234 filed on Mar. 16, 2009, which is hereby incorporated by reference herein in its entirety.

What is claimed is:

1. An image forming device comprising:
 a first layer control unit that controls a function for forming an image on a printing material;
 a primary second layer control unit that is controlled by the first layer control unit and controls a first load; and
 a secondary second layer control unit that is controlled by the first layer control unit and controls a second load,
 wherein the secondary second layer control unit comprises a first monitoring unit that monitors, when the secondary second layer control unit has not controlled the second load, signals from the first load and commands transmitted and received between the primary second layer control unit and the first layer control unit, and detects an error of the primary second layer control unit based on the signals from the first load and signals transmitted from the primary second layer control unit to the first layer control unit, and
 wherein the first monitoring unit does not execute a processing for detecting the error of the primary second layer control unit when the secondary second layer control unit has controlled the second load.

2. The device according to claim 1, wherein a signal line connected with the first load is connected to the primary and secondary second layer control units.

3. The device according to claim 1, wherein the secondary second layer control unit notifies the first layer control unit of error information including error contents and an error portion detected by the first monitoring unit, and
 wherein the first layer control unit notifies a user of the error information notified by the secondary second layer control unit.

4. The device according to claim 1, wherein the primary second layer control unit comprises a second monitoring unit that monitors, when the primary second layer control unit has not controlled the first load, signals from the second load and commands transmitted and received between the secondary second layer control unit and the first layer control unit, and detects an error of the secondary second layer control unit based on the signals from the second load and signals transmitted from the secondary second layer control unit to the first layer control unit.

5. The device according to claim 1, wherein the primary second layer control unit and the secondary second layer control unit are operated with exclusive operations.

* * * * *